(12) United States Patent
Dammu et al.

(10) Patent No.: US 11,605,218 B2
(45) Date of Patent: Mar. 14, 2023

(54) SYSTEMS AND METHODS FOR CONSTRUCTING A MODULAR SIAMESE NETWORK FOR FACE VERIFICATION

(71) Applicant: Tata Consultancy Services Limited, Mumbai (IN)

(72) Inventors: Preetam Prabhu Srikar Dammu, Hyderabad (IN); Srinivasa Rao Chalamala, Hyderabad (IN); Ajeet Kumar Singh, Pune (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 76 days.

(21) Appl. No.: 17/358,496

(22) Filed: Jun. 25, 2021

(65) Prior Publication Data

US 2022/0269893 A1 Aug. 25, 2022

(30) Foreign Application Priority Data

Feb. 25, 2021 (IN) .............................. 202121007953

(51) Int. Cl.
*G06K 9/62* (2022.01)
*G06V 10/94* (2022.01)
(Continued)

(52) U.S. Cl.
CPC ........... *G06V 10/95* (2022.01); *G06K 9/6215* (2013.01); *G06K 9/6256* (2013.01); *G06K 9/6288* (2013.01); *G06N 3/0454* (2013.01); *G06N 3/088* (2013.01); *G06V 10/955* (2022.01); *G06V 40/168* (2022.01); *G06V 40/172* (2022.01)

(58) Field of Classification Search
CPC .... G06V 40/172; G06V 40/16–40/179; G06V 10/82; G06V 10/955; G06N 20/00–20/20; G06N 3/02–3/105; G06N 3/0454; G06T 2207/20081; G06T 2207/20084; G06T 3/4046; G06T 9/002
See application file for complete search history.

(56) References Cited

U.S. PATENT DOCUMENTS

2022/0027732 A1* 1/2022 Arslan ............... G06V 40/1365
2022/0058426 A1* 2/2022 Song ..................... G06V 10/50

FOREIGN PATENT DOCUMENTS

CN 111191616 A 5/2020

* cited by examiner

*Primary Examiner* — Brian Werner
(74) *Attorney, Agent, or Firm* — Finnegan, Henderson, Farabow, Garrett & Dunner LLP

(57) ABSTRACT

Performance enhancement of face verification systems is credited due to advancement in deep learning methods. However, these systems fail to provide interpretations for decision makings despite their ability to attain high accuracy. Various post-hoc methods have been proposed due to increased demand of deep learning models for better interpretations. However, face verification systems are still prone to adversarial attacks. Present disclosure provides a face verification system and method which addresses the issue of interpretability by employing modular neural network(s), wherein representations for each individual facial feature such as nose, mouth, eyes, etc., are learned separately and verification of input face images is performed. Through experiments, present disclosure demonstrates that the method described herein is resistant to adversarial attacks, thereby addressing another crucial weakness concerning deep learning models.

15 Claims, 8 Drawing Sheets

(51) Int. Cl.
*G06N 3/04* (2023.01)
*G06N 3/088* (2023.01)
*G06V 40/16* (2022.01)

SYSTEMS AND METHODS FOR CONSTRUCTING A MODULAR SIAMESE NETWORK FOR FACE VERIFICATION

PRIORITY CLAIM

This U.S. patent application claims priority under 35 U.S.C. § 119 to: India Application No. 202121007953, filed on Feb. 25, 2021. The entire contents of the aforementioned application are incorporated herein by reference.

TECHNICAL FIELD

The disclosure herein generally relates to face verification systems, and, more particularly, to systems and methods for constructing a modular Siamese network for face verification.

BACKGROUND

One of the most successful applications of Artificial Intelligence is facial (or biometric) verification system. In the process of human face identification, machines have superseded human abilities using deep learning methods. At present, most of the critical applications use such deep learning techniques. Facial unlock feature has had its application in various domains ranging from its use in mobile phones to surveillance. Yet, the current methods have some major drawbacks which need to be addressed. Some of the drawbacks of the conventional methods are that they are susceptible to adversarial noise and these methods can be fooled by malicious events leading to security issues. Further, these conventional methods fail to provide any inference knowledge/interpretations for decision making. For instance, there could be undesirable effects on the decision when partially occluded images are processed to provide resultant output.

SUMMARY

Embodiments of the present disclosure present technological improvements as solutions to one or more of the above-mentioned technical problems recognized by the inventors in conventional systems. For example, in one aspect, there is provided a processor implemented method for face verification. The method comprises receiving, by a pre-trained feature extractor executed via one or more hardware processors, a pair of face images corresponding to one or more users; generating, via the pre-trained feature extractor, a pair of feature vectors using the pair of face images corresponding to the one or more users, wherein each feature vector from the pair of feature vectors comprises one or more features corresponding to the users; generating, via one or more disentangling encoders comprised in a modular Siamese network executed by the one or more hardware processors, a pair of feature-specific disentangling embeddings based on the pair of feature vectors; computing, via a plurality of corresponding Siamese networks comprised in the modular Siamese network executed by the one or more hardware processors a distance vector for each feature comprised in the pair of feature-specific disentangling embeddings, wherein each Siamese network from the plurality of Siamese networks is operatively connected to a corresponding disentangling encoder of the one or more disentangling encoders; concatenating the distance vector computed for each feature by each of the plurality of Siamese networks to obtain a concatenated distance vector; and verifying, via a feed forward fully connected network, the pair of face images based on the concatenated distance vector.

In an embodiment, the processor implemented method further comprises computing a feature-wise Euclidean distance for each of the one or more features based on the computed distance vector; and generating a heatmap for each of the one or more features based on the computed feature-wise Euclidean distance.

In an embodiment, the pair of face images comprises a pair of valid face images or a pair of imposter face images.

In an embodiment, the step of receiving, by a pre-trained feature extractor executed via one or more hardware processors, a pair of face images corresponding to one or more users is preceded by: receiving, via the one or more hardware processors, one or more input face images of one or more users; masking, via the one or more hardware processors, the one or more input face images to obtain one or more reconstructed target images, wherein each of the one or more reconstructed target images comprises one or more region of interests; training, one or more disentangling autoencoders via the one or more hardware processors, using the one or more reconstructed target images comprising the one or more regions of interests to obtain one or more trained disentangling autoencoders; and substituting one or more decoders comprised in the one or more trained disentangling autoencoders with one or more corresponding Siamese networks to obtain a modular Siamese network.

In an embodiment, a latent dimension comprised between an encoder and a decoder of each of the one or more disentangling autoencoders is lower than an input dimension.

In another aspect, there is provided a system for face verification. The system comprises a memory storing instructions; one or more communication interfaces; and one or more hardware processors coupled to the memory via the one or more communication interfaces, wherein the one or more hardware processors are configured by the instructions to: receive, by a pre-trained feature extractor executed via the one or more hardware processors, a pair of face images corresponding to one or more users; generate, via the pre-trained feature extractor, a pair of feature vectors using the pair of face images corresponding to the one or more users, wherein each feature vector from the pair of feature vectors comprises one or more features corresponding to the users; generate, via one or more disentangling encoders comprised in a modular Siamese network executed by the one or more hardware processors, a pair of feature-specific disentangling embeddings based on the pair of feature vectors; compute, via a plurality of corresponding Siamese networks comprised in the modular Siamese network executed by the one or more hardware processors a distance vector for each feature comprised in the pair of feature-specific disentangling embeddings, wherein each Siamese network from the plurality of Siamese networks is operatively connected to a corresponding disentangling encoder of the one or more disentangling encoders; concatenate the distance vector computed for each feature by each of the plurality of Siamese networks to obtain a concatenated distance vector; and verify, via a feed forward fully connected network, the pair of face images based on the concatenated distance vector.

In an embodiment, the one or more hardware processors are further configured by the instructions to compute a feature-wise Euclidean distance for each of the one or more features based on the computed distance vector; and generate a heatmap for each of the one or more features based on the computed feature-wise Euclidean distance.

In an embodiment, the pair of face images comprises a pair of valid face images or a pair of imposter face images.

In an embodiment, the modular Siamese network is obtained by: receiving, via the one or more hardware processors, one or more input face images of one or more users; masking, via the one or more hardware processors, the one or more input face images to obtain one or more reconstructed target images, wherein each of the one or more reconstructed target images comprises one or more region of interests; training, one or more disentangling autoencoders via the one or more hardware processors, using the one or more reconstructed target images comprising the one or more regions of interests to obtain one or more trained disentangling autoencoders; and substituting one or more decoders comprised in the one or more trained disentangling autoencoders with one or more corresponding Siamese networks to obtain the modular Siamese network.

In an embodiment, a latent dimension comprised between an encoder and a decoder of each of the one or more disentangling autoencoders is lower than an input dimension.

In yet another aspect, there are provided one or more non-transitory machine readable information storage mediums comprising one or more instructions which when executed by one or more hardware processors causes a method for face verification by: receiving, by a pre-trained feature extractor executed via the one or more hardware processors, a pair of face images corresponding to one or more users; generating, via the pre-trained feature extractor, a pair of feature vectors using the pair of face images corresponding to the one or more users, wherein each feature vector from the pair of feature vectors comprises one or more features corresponding to the users; generating, via one or more disentangling encoders comprised in a modular Siamese network executed by the one or more hardware processors, a pair of feature-specific disentangling embeddings based on the pair of feature vectors; computing, via a plurality of corresponding Siamese networks comprised in the modular Siamese network executed by the one or more hardware processors a distance vector for each feature comprised in the pair of feature-specific disentangling embeddings, wherein each Siamese network from the plurality of Siamese networks is operatively connected to a corresponding disentangling encoder of the one or more disentangling encoders; concatenating the distance vector computed for each feature by each of the plurality of Siamese networks to obtain a concatenated distance vector; and verifying, via a feed forward fully connected network, the pair of face images based on the concatenated distance vector.

In an embodiment, the processor implemented method further comprises computing a feature-wise Euclidean distance for each of the one or more features based on the computed distance vector; and generating a heatmap for each of the one or more features based on the computed feature-wise Euclidean distance.

In an embodiment, the pair of face images comprises a pair of valid face images or a pair of imposter face images.

In an embodiment, the step of receiving, by a pre-trained feature extractor executed via one or more hardware processors, a pair of face images corresponding to one or more users is preceded by: receiving, via the one or more hardware processors, one or more input face images of one or more users; masking, via the one or more hardware processors, the one or more input face images to obtain one or more reconstructed target image herein each of the one or more reconstructed target mages comprises one or more region of interests; training, one or more disentangling autoencoders via the one or more hardware processors, using the one or more reconstructed target images comprising the one or more regions of interests to obtain one or more trained disentangling autoencoders; and substituting one or more decoders comprised in the one or more trained disentangling autoencoders with one or more corresponding Siamese networks to obtain a modular Siamese network.

In an embodiment, a latent dimension comprised between an encoder and a decoder of each of the one or more disentangling autoencoders is lower than an input dimension.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
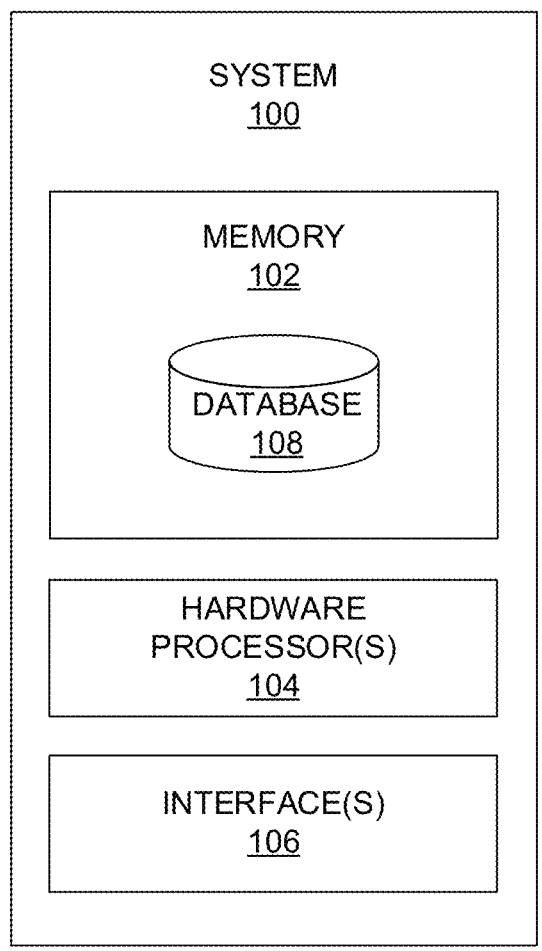
FIG. 1 depicts a system for constructing a modular Siamese network for face verification, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or Ike parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Over the years, many deep learning methods for face verification have been proposed and some of these have superseded human abilities in terms of performance. Though these enable performances that have been exceptional, these have failed to provide any reasoning for their predictions. Therefore, relying on such black boxes-based predictions for decision making could be detrimental in applications, for example, medical/healthcare, financial solutions, and security applications.

Previously, various methods have been proposed for image recognition to avert interpretability by provisioning reasoning during image recognition. Conventionally, techniques such as layer-wise relevance propagation (LRP), Gradient-weighted Class Activation Mapping (Grad-CAM), Local Interpretable Model-Agnostic Explanations (LIME) have been used for highlighting image regions or region of interests that are utilized for making predictions. Though, there are several interpretability methods, it is desirable to have an inherently capable system and method for output interpretations for making decisions. When the latent features generated by the system are used to depict object part(s), the contributions of these features for the final prediction play a critical role.

Though these interpretability methods obtain heatmaps that highlight region of interest, it is still a challenging task to understand these heatmaps are generated at pixel-level. However, it these heatmaps depict logically visual concepts, then the interpretations become much easier which is not the case.

Further drawback of such deep learning models is that they are susceptible to adversarial attacks. Deep learning methods/models can be fooled by insignificant noise that is gradual in nature to human eye. There have been quite a few black box and white box adversarial attack methods present in the literature. However, the problem of resolving such adversarial attacks on deep learning models remain unsolved at large. It is important to develop efficient systems as these attacks pose a serious security threat. Embodiments of the present disclosure provide systems and methods that integrate both robustness to attacks as well as interpretability into face verification systems. More specifically, present disclosure provides face verification system and method that address the aforementioned issues by learning independent latent representations of high-level facial features. The method of the present disclosure generates heatmaps on the fly that are more intuitive and easily interpretable/understood and is also shown to be much more robust against adversarial examples.

Face recognition is known to be a non-invasive biometric authentication mechanism that is widely used for several years though there are some reservations on its usage due to various privacy reasons. Being one of the preferred choices by users for authentication of end user applications, it has proven to be easy to use and averts requirement of remembering passwords.

In terms of performances, deep learning-based face recognition systems have done better when compared to hand crafted feature-based systems and shallow learning systems. Previously, a deep learning architecture called VGGFace was proposed for generating facial feature representations or face embeddings, which could be used for person identification using a similarity measure or a classifier. Another work used a Bayesian learning framework for learning metrics for face recognition. Yet another work proposed a compact embedding learned directly from images using triplet-loss for face verification. Various research works have been proposed wherein different loss functions are used that maximize intra-class similarity and improve discriminability for faces. However, these existing face recognition models are extremely vulnerable to adversarial attacks in various settings, including the black box settings, thus leading to security concerns and the requisite for development of robust face recognition models. Such attacks further involve small, imperceptible, and carefully crafted perturbations as input for fooling machine learning models. An attacker is allowed to evade detection or recognition or to impersonate another person by use of such adversarial attacks. Another research work described a method to realize adversarial attacks based on an introduction to eyeglasses. These glasses could be used to evade detection or to impersonate others.

Understanding and interpreting the decisions of machine learning systems is of high importance in many applications, as it allows reasoning verification of the system thereby providing information to the end user (e.g., such as domain experts or subject matter experts). Some of the research works include direct visualization of the filters, deconvolutional networks, etc., to reconstruct inputs from different layers. Some of the widely known interpretability methods such as Layer-wise Relevance Propagation (LRP), Gradient-weighted Class Activation Mapping (Grad-CAM), Grad-CAM++, SHapley Additive exPlanations (SHAP) values and Local Interpretable Model-Agnostic Explanations (LIME) have been proposed in the past. Most of these techniques attempt to provide explanations that are at pixel-level that indicate their contributions for decision making. However, these methods are best suited for tasks such as object recognition where only a single input image is fed as an input to the DL model. While a few methods have emerged that attempt for explaining behavior and decisions of face recognition systems, these have relied on controlled degradations using inpainting to generate explanations, There are other methods which have used visual psychophysics to probe and study face recognition system's behavior. While other methods have used a loss function that introduces interpretability to the face verification model through training. Yet another method visualizes and understand how the model represents the information of face images through 3D modeling. Conventionally, fooling technique(s) have been used to gain insights on facial regions that contribute for decision makings. Further, explain ability methods that are recently developed differ from each other in terms of their approach and in providing interpretabilities. More specifically, each of these methods have their own pros and cons and are suitable for different purposes. Method of the present disclosure has characteristics that are best-suited for real world applications, easily interpretable feature level explanations, on-the-fly explanations for every prediction, with structurally interpretable model architecture that provides real-time feedback and is robust towards adversarial attacks.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 depicts a system 100 for constructing a modular Siamese network for face verification, in accordance with an embodiment of the present disclosure. In an embodiment, the system 100 may also be referred as face verification system or verifications system and may be interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises face images of various users, masked dataset (or also referred as reconstructed face images having region of interests), training dataset, training information, the modular Siamese network. The database 108 further stores each pair being received during the testing phase for face verification, a pair of feature vectors generating using the pair of face images, a pair of feature-specific disentangling embeddings corresponding to the pair of feature vectors, a corresponding distance vector for each feature comprised in the pair of feature-specific disentangling embeddings, concatenated distance vector(s) computed for each input pair of face images received during the testing phase(s), verification output(s) such as input pair being verified as valid face images or imposter face images, and the like.

The database 108 further comprises various techniques such as feature extractor(s), distance vector computing technique, concatenating technique(s) as known in the art, and the like. The above-mentioned techniques comprised in the memory 102/database 108 are invoked as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
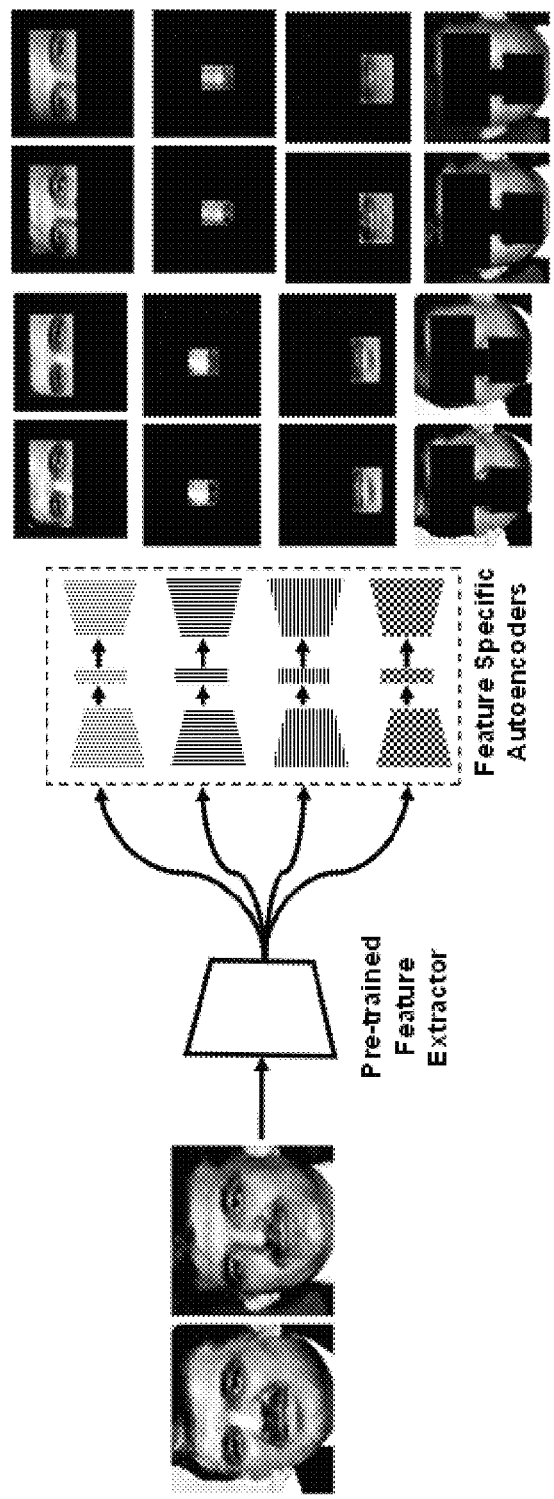
FIG. 2 depicts an exemplary block diagram of the system illustrating training of the system of FIG. 1, in accordance with an embodiment of the present disclosure.
Figure 3:
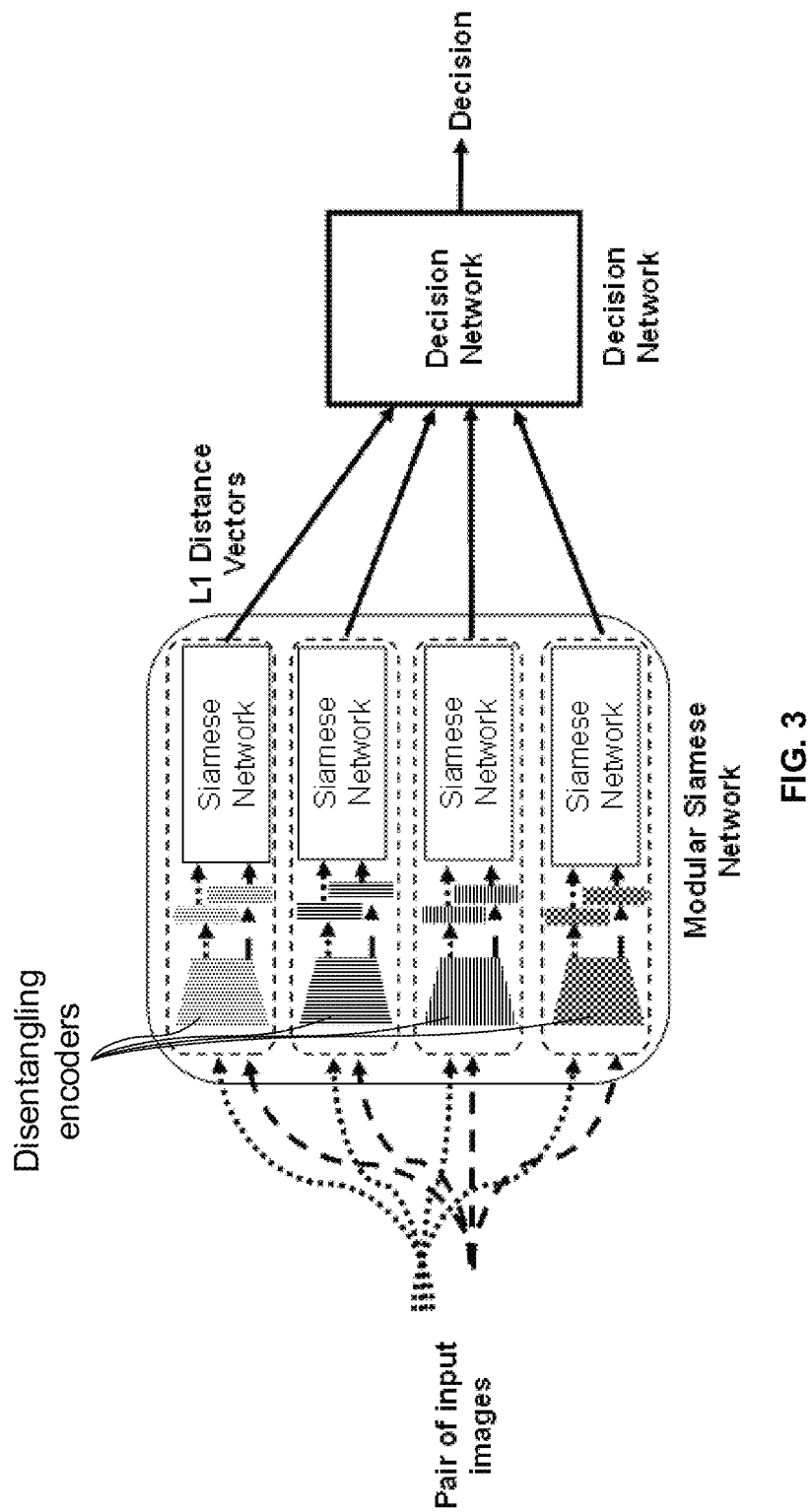
FIG. 3 depicts a modular Siamese network comprised in the system 100 for face verification, in accordance with an embodiment of the present disclosure.

FIG. 2, with reference to FIG. 1, depicts an exemplary block diagram of the system 100 illustrating training of the system 100, in accordance with an embodiment of the present disclosure. As can be seen in FIG. 2, the system 100 receives one or more input face images of one or more users. More specifically, a pre-trained feature extractor comprised in the memory 102 of the system 100 receives the one or more input face images as shown in FIG. 2. The input face images are then masked by one or more disentangling autoencoders (e.g., also referred as 'feature specific autoencoders' and interchangeably used herein) to obtain one or more reconstructed target images. In an embodiment, the one or more disentangling autoencoders are comprised in the memory 102 and accordingly executed/invoked by the one or more hardware processors 104 to perform the methodology described herein. Each of the one or more reconstructed target images comprises one or more region of interests (e.g., eyes, nose, mouth, other parts of the input face images, etc.). The one or more disentangling autoencoders are trained using the one or more reconstructed target images comprising the one or more regions of interests to obtain one or more trained disentangling autoencoders. Upon obtaining the one or more trained disentangling autoencoders, one or more decoders comprised in the one or more trained disentangling autoencoders are substituted with one or more corresponding Siamese networks to obtain a modular Siamese network. In other words, system 100 of the present disclosure allocates dedicated modules for eyes, nose, mouth and one for the rest of the features. Autoencoders are employed by the system 100 to learn separate and distinct latent representations for different facial features, To achieve this, the input images are masked to retain only the region of interest of that specific module and present it as the target image. After the autoencoders have been trained, the encoder(s) are retained and the respective decoders are substituted with Siamese networks in all the modules, resulting in a modular Siamese Network. FIG. 3, with reference to FIGS. 1 through 2, depicts the modular Siamese network comprised in the system 100 for face verification, in accordance with an embodiment of the present disclosure.

Figure 4:
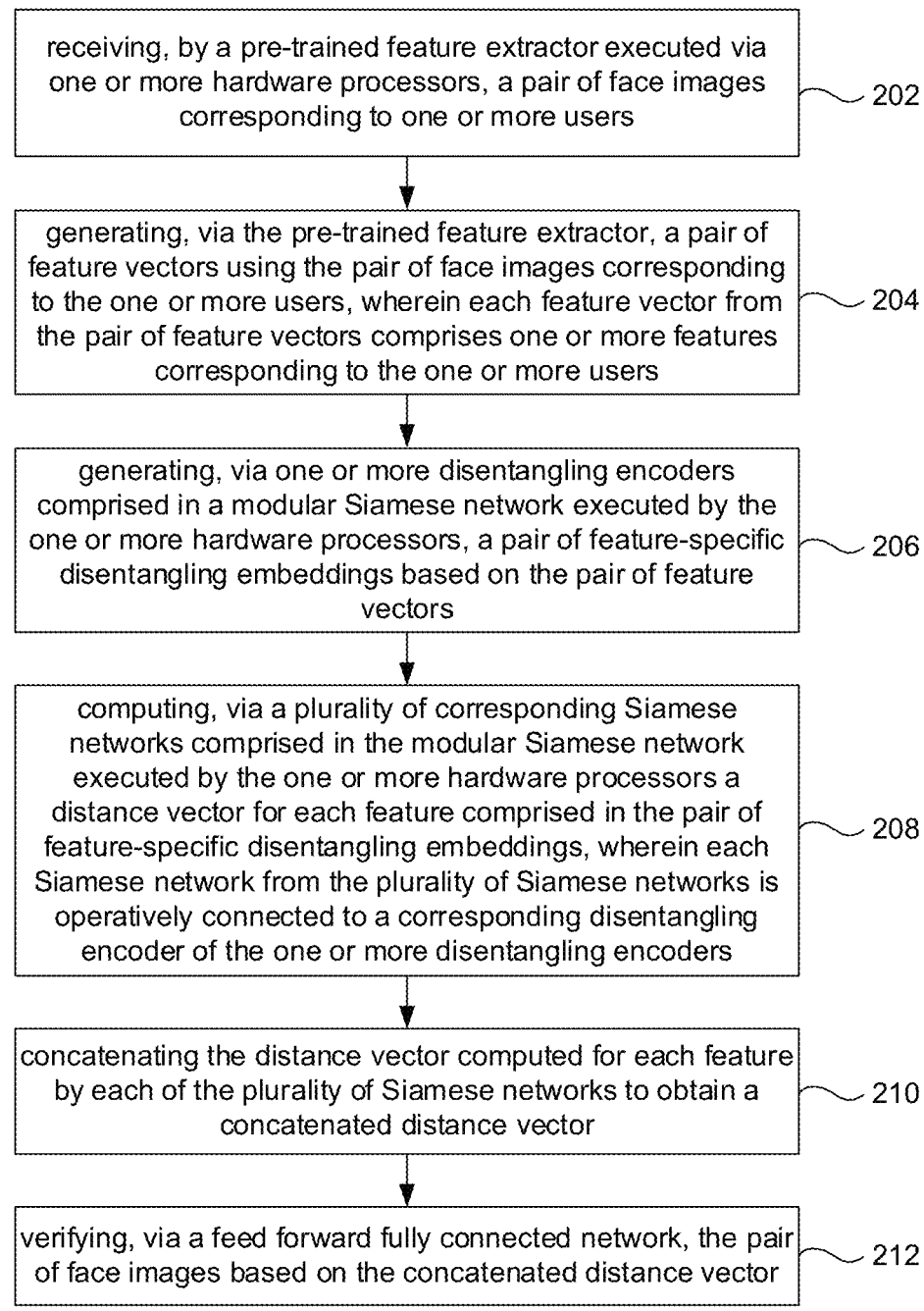
FIG. 4 depicts an exemplary flow chart illustrating a method for face verification, using the constructed modular Siamese network of FIG. 3 comprised in the system of FIG. 1, in accordance with an embodiment of the present disclosure.
Figure 5:
FIG. 5 depicts a pair of face images corresponding to one or more users, in accordance with an embodiment of the present disclosure.

FIG. 4, with reference to FIGS. 1 through 3, depicts an exemplary flow chart illustrating a method for face verification, using the constructed modular Siamese network of FIG. 3 comprised in the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1 through FIG. 3, and the flow diagram as depicted in FIG. 2. In an embodiment, at step 202 of the present disclosure, the pre-trained feature extractor executed via the one or more hardware processors 104, receive a pair of face images corresponding to one or more users. For instance, FIG. 5, with reference to FIGS. 1 through 4, depicts the pair of face images corresponding to one or more users, in accordance with an embodiment of the present disclosure.

In an embodiment, at step 204 of the present disclosure, a pair of feature vectors are generated using the pair of face images corresponding to the one or more users, via the pre-trained feature extractor executed by the one or more hardware processors 104. Each feature vector from the pair of feature vectors comprises one or more features corresponding to the one or more users. Examples of feature vectors are provided below for each of the input face image.

Feature vector 1 corresponding to a first input image of the pair of face images:
Size: 512
Value: [−1.47956023e-02 51663737e-02 −6.04083240e-02
−6.90396922e-03  8.29936713e-02  1.47839822e-02
1.91138834e-02   3.40125635e-02  4.82874326e-02
−1.12229884e-02  −4.08622399e-02 1.88203696e-02
1.28132012e-02   −4.00388241e-03 −8.83898174e-04
2.79901531e-02   −1.47752324e-02 −7.82593805e-03
−9.55611654e-03 −3.00825518e-02, . . . , −2.12387275e-02 −2.33110413e-02 −3.54247279e-02 1.18804732e-02
−6.49961680e-02  −6.42113760e-02 1.93013512e-02
−1.94678996e-02  −2.18354780e-02 2.07301825e-02
6.48121834e-02   4.81924154e-02  2.85213930e-03
7.12121977e-03 5.58932638e-0 −4.47465815e-02]

Feature vector 2 corresponding to a second input image of the pair of face images:
Size: 512
Value: [1.80459749e-02 −2.00891662e-02 −1.65833868e-02 7.19398335e-02 7.37359598e-02 4.25952710e-02
−3.61703150e-02  3.77402231e-02  4.26952951e-02
7.06877699e-03   −1.02028232e-02 4.96506169e-02
−4.75536436e-02  9.66101140e-03  −3.17144506e-02
−2.29576174e-02, . . . , 1.04197681e-01 −1.57547668e-02 −1.92272328e-02 −2.71256492e-02 −5.24459817e-02
−5.64004965e-02  −3.07491440e-02 4.85639740e-03
3.39436941e-02   −3.33838314e-02 3.15936394e-02
9.77075286e-03   2.75935084e-02  4.73020598e-02
−1.35369813e-02  −5.54361083e-02 2.44451733e-03
−4.77753878e-02]

At step 206 of the present disclosure, the one or more disentangling encoders comprised in the modular Siamese network executed by the one or more hardware processors 104, generate a pair of feature-specific disentangling embeddings based on the pair of feature vectors. In other words, disentangled embeddings of facial features are generated for both of the input images by the feature extracting encoders present in each feature specific module as depicted in FIG. 3. Examples of feature-specific disentangling embeddings are provided below for feature comprised in the pair of input images.

Image 1, Eyes (say feature 1) Embedding (Size: 100):
[0.04717445  −0.00716048 0.02850642  0.12867065
0.01182748  0.02374022  −0.3758254  −0.00461901
0.0592342   0.1289542   −0.01489787 0.04539325
0.03431422  −0.03434951 0.01249361  −0.01985516
0.02426858  −0.01040753 −0.0036001  −0.03263026
−0.04262977 0.04183937 0.00476335 . . . 0.01259478
−0.04003039 0.00146029 −0.00463578 0.15385374
0.06462353  −0.02935677 −0.06995005 0.00452138
−0.039844   −0.10731624 0.02875388  0.03827807
0.08335304 −0.07274138 0.28479534 0.00535056]

Image 1, Nose (say feature 2) Embedding (Size: 100):
[−1.2044159e-02   9.0135001e-02   7.7605836e-02
−2.1859698e-03   −4.9414773e-02  4.0102813e-02
1.2698635e-01    −3.4950446e-02  3.0753011e-02
6.3321157e-03    −1.6832291e-01  8.8902693e-03
3.4335654e-04    −2.6101131e-02  8.0560774e-02
9.7817183e-02    1.3820088e-02   2.5131993e-02
1.7075332e-01 . . . −1.2542143e-01 −1.3418601e-01
−9.3976911e-03   1.1844151e-02   3.3661537e-02
−1.4649558e-01   6.9886908e-02   −1.6661463e-02
−2.1926658e-02   6.2305447e-02   −4.4473868e-02
7.9528317e-02    −6.5375365e-02  3.6805306e-02
−7.1669392e-02 9.4321623e-02]

Image 1, Mouth (say feature 3) Embedding (Size: 100):
[0.02025897  −0.46522596 0.1277581   −0.09048672
−0.05654893 0.01142018  0.01095072  −0.0064917
−0.18892    0.06610408  −0.08708763 0.03410822
−0.01090111 0.10172352  −0.04417424 0.03537268
−0.09630242 −0.08165787 0.01324212  0.04515652
0.06298108  0.04466021  0.03814296  0.0049233
−0.00067541 0.06277141  −0.05622606 0.14843987
−0.07502926 . . . 0.10728258 0.04861293 0.07662527
0.04173082  0.1030068   −0.00907986 −0.02694303
−0.10247143 −0.09905419 0.01001242 0.00945997]

Image 1, Remaining area (say feature 4) Embedding (Size: 100): [−0.09733367  0.01690328  −0.07872576
−0.06173009 0.01740663  0.05026554  −0.05757754
0.12949005  0.05684388  −0.05076239 0.06702389
−0.11398967 0.33200642  −0.06079308 −0.05410519
−0.05438561 −0.01632283 0.11358386  −0.09616073
0.06131846  0.05029731  0.26606882  0.10056166
0.04972734  −0.07486667 −0,00037282 0.00172895
−0.0721463  −0.08058434 −0.08248436 −0.1326903
−0.12578063 0.0237024 0.0435237]

Image 2 (or the second image), Eyes (say feature 1) Embedding (Size: 100): [−0.06858514 0.0276947 −0.02493729
−0.00291479 0.00439166  0.00051103  −0.27920368
0.04539644  0.05652691  0.09015923  −0.02606046
0.10824473  −0.05651316 0.01169924 . . . −0.00206706
−0.13627468 0.02025674  −0.01603951 −0.04511847
−0.12308104 0.03584217  0.06935322  0.04841046
−0.00302072 0.01779897  0.00966111  0.03448394
0.04668801  0.09590974  0.00413076  −0.08898262
0.09091406  0.03819072  −0.07092465 0.10869495
0.16852055  0.00352316  −0.01487993 0.28602955
−0.02963297]

Image 2 (or the second image), Nose (say feature 2) Embedding (Size: 100): [−3.5388935e-02 2.96648815e-02
3.03541925e-02   −1.97931807e-02 −5.41007109e-02
−5.18440641e-02  1.21891938e-01  −9.18417051e-02
6.98648579e-03   −1.43625156e-03 −9.33517963e-02
−6.16073934e-03  −2.38023279e-03 6.86637033e-03
−4.84920293e-03 . . . 1.36897629e-02 −1.70406193e-01
−9.25683603e-02  3.58882286e-02  −6.71733096e-02
−6.74581453e-02  −3.50001119e-02 5.20885848e-02
6.45964360e-03   4.90984954e-02  −2.23494750e-02
9.54946596e-03   6.37379438e-02  −6.83840644e-03
1.58515219e-02 −5.84458262e-02 5.16824909e-02]

Image 2 (or the second image), Mouth (say feature 3) Embedding (Size: 100): [5.97765222e-02 −4.43514496e-01 −3.49978954e-02 −3.80398072e-02 5.23065887e-02
3.19057629e-02   3.07690259e-02  −2.67390497e-02
−1.35866329e-01  4.04293612e-02  3.05634085e-03
3.70626716e-04   3.02185733e-02  6.04048334e-02
−7.93083459e-02  −4.48902361e-02 −5.05295135e-02
−2.89900918e-02  1.19160056e-01  1.18986461e-02
2.26449683e-01   −2.16273889e-02 9.89924801e-02
5.09192273e-02   5.24277724e-02  6.05678968e-02
1.30485952e-01   −5.40756918e-02 −2.41429865e-04
−3.02353017e-02  −1.34458557e-01 1.38144614e-02
6.99999854e-02]

Image 2 (or the second image), Remaining area (say feature 4) Embedding (Size: 100): [−2.5984548e-02
−6.6636890e-02   3.6474422e-03   −1.7522961e-01
3.7371252e-02    −2.5111120e-02  7.9838866e-03
1.8797861e-01    −3.0303661e-02  −7.4877396e-02
1.0177809e-01    −1.2003521e-02  2.5539586e-01
1.6439848e-02    1.5924910e-01   9.6689470e-02
7.6483175e-02    4.3302730e-02   5.5197138e-02
4.4101565e-03    2.8930830e-03   −6.9081366e-02
1.8770258e-01    1.3686603e-01   7.2502553e-02
−1.3463634e-01   −1.5056738e-01  −8.8227212e-02

−5.1503651e-02 −8.7724879e-02 −1.4616005e-01
−1.1674935e-01 −9.5769979e-02 4.1028645e-02
4.9281113e-02]

The above examples can be better understood by way of the following description:

System as depicted in FIGS. 1 through 3 of the present disclosure comprises one or more undercomplete autoencoders as known in the art, a type of autoencoder which has a latent dimension lower than the input dimension. The undercomplete autoencoders are trained to reconstruct the original image as accurately as possible while constricting the latent space to a sufficiently small dimension to ensure that only the most salient features are retained in the encoded latent vectors. To achieve this task of extracting feature specific latent vectors, instead of giving a full Image as the target, the input image is masked both during the training phase and testing phase and only a part of the image containing the feature of interest is fed to the system to produce these as the target images. Consequently, the autoencoder learns a latent representation containing important information about the feature and restores only the required part of the image.

Referring to the steps of FIG. 4, upon generating feature-specific disentangling embeddings for each feature based on the pair of feature vectors, in an embodiment of the present disclosure, at step 208, a plurality of corresponding Siamese networks comprised in the modular Siamese network executed by the one or more hardware processors 104 compute a distance vector for each feature comprised in the pair of feature-specific disentangling embeddings. Each Siamese network from the plurality of Siamese networks is operatively connected to a corresponding disentangling encoder of the one or more disentangling encoders, in one embodiment of the present disclosure as depicted in FIG. 3, Examples of the distance vector for feature of the pair of feature-specific disentangling embeddings are provided below:

Eyes Distance Vector (Size: 100):
[0. 0. 0. 0. 0. 0. 0. 0. 0. 0. 0. 0. 0. 0. 0. 0. 0. 0. 0. 0. 0. 0.00847542 0. 0. 0.02451951 0. 0. 0. 0. 0.02441413 0. 0.00568552 0. 0.00151026 0, 0. 0. 0. 0, 0. 0. 0. 0, 0. 0. 0. 0.04804978 0. 0.0063985 0. 0.03070473 0. 0. 0.05075208 0. 0. 0.13273259 0. 0.01771411 0. 0.02506472 0. 0. 0. 0. 0. 0. 0.05130108 0.00789097 0. 0. 0. 0. 0.00821024 0. 0. 0. 0.01388875 0. 0. 0. 0. 0.00442729 0. 0. 0. 0. 0. 0.09372626 0. 0.00550736 0.03665866 0. 0. 0.00651422 0]

Nose Distance Vector (Size: 100):
[0.00738776 0. 0.00386625 0. 0.00721514 0.02900551 0. 0.05036239 0. 0.04286243 0.07337299 0.02649865 0. 0. 0.02497154 0.1111951 0.02065703 0. 0. 0. 0. 0.12290592 0.0061464 0. 0. 0. 0. 0. 0.15465565 0. 0.00847926 0.05018251 0.11114596 0. 0.02453978 0.01981913 0.01510617 0. 0. 0. 0. 0. 0.02191404 0. 0.01109802 0. 0. 0.01412931 0. 0. 0. 0. 0. 0. 0. 0. 0.01298612 0. 0. 0. 0. 0. 0. 0. 0.04101541 0. 0. 0. 0. 0. 02115072 0.05605236 0.126096890. 0.013396650 0. 0. 0. 0. 0.11183666 0. 0.09688628 0. 0. 0. 0. 0. 0.17572734 0. 0.1379151 0. 0.01774204 0]

Mouth Distance Vector (Size: 100):
[0. 0.01915645 0.16342808 0. 0.00202094 0. 0. 0. 0. 0.18942796 0. 0. 0. 0.05845224 0. 0. 0. 0. 0. 0. 0.19294386 0.21756673 0.05139332 0. 0.02665375 0.12016577 0.051585 0. 0. 0.0036067 0.0540234 0. 0. 0. 0.06178814 0. 0. 0. 0.0280844 0. 0. 0.06412166 0. 0.0 0.137524 0.05167086 0. 0.0197652 0. 0. 0. 0.04285314 0.15722261 0. 0. 0.05923241 0. 0. 0. 0. 0. 0. 0. 0. 0. 0. 0.14718871 0. 0. 0. 0. 0.06105956 0. 0. 0. 0.01194391 0. 0. 0. 0. 0. 0.179174500. 0. 0. 0.2202653 0. 0. 0.06317589 0. 0.02332353 0.01481021 0. 0.09529169 0.]

Remaining Area Distance Vector (Size: 100):
[0. 0.13832238 0.11783378 0. 0.14023489 0. 0. 0. 0. 0. 0.03340167 0. 0. 0. 0. 0. 0. 0. 0. 0. 0.0935358 0. 0. 0. 0. 0.1800088 0. 0.07987829 0. 0.08291682 0.01226721 0. 0. 0. 0. 0. 0. 0. 0. 0. 0. 0. 0.0852061 0. 0.06087895 0.03293431 0. 0. 0. 0. 0. 0. 0. 0. 0.1710799 0. 0. 0. 0. 0. 0. 0. 0. 0. 0.03869553 0. 0. 0. 0. 0. 0.11299279 0. 0.1256792 0. 0. 0. 0. 0. 0. 0.07545868 0. 0. 0.07524645 0. 0. 0.12755004 0. 0.10815609 0. 0. 0. 0.]

Siamese networks have achieved great results in image verification. The same weights and parameters are shared by the two Siamese twin networks. The hypothesis is that if the inputs, say, x1 and x2 are similar, then the distance between the output vectors h1 and h2 shall be less. The network is trained to maximize the distance between mismatched pairs is maximized and reduce the distance between matched pairs. To achieve this task, loss functions such as contrastive loss and triplet loss can also be used. In the systems of FIGS. 1 through 3 of the present disclosure, Siamese networks are implemented for discriminating between feature specific latent vectors of impostors and valid pairs. The feature-extracting autoencoders as described above are used to obtain latent vectors x1 and x2. Distance vectors, say L1, are computed from output vectors h1 and h2 that are obtained from the Siamese twins for each module. The distance vectors from all the modules are then concatenated and this concatenated distance vector is fed as input to the decision network. In other words, at step 210 of the present disclosure, the distance vector computed for each feature is concatenated by each of the plurality of Siamese networks to obtain a concatenated distance vector. Examples of the concatenated distance vector for the features is provided below:

Concatenated Distance Vector (Size: 400):
[0. 0. 0. 0. 0. 0. 0. 0. 0. 0. 0. 0. 0. 0. 0. 0. 0. 0. 0. 0. 0. 0.00847542 0. 0. 0.02451951 0. 0. 0. 0. 0.02441413 0. 0.00568552 0. 0.00151026 0. 0. 0. 0. 0. 0. 0. 0. 0. 0. 0. 0.04804978 0. 0.0063985 0. 0.03070473 0. 0. 0.05075208 0. 0. 0.13273259 0. 0.01771411 0. 0.02506472 0. 0. 0. 0. 0. 0. 0.05130108 0.00789097 0. 0. 0. 0. 0.00821024 0. 0. 0. 0.01388875 0. 0. 0. 0. 0.00442729 0. 0. 0. 0. 0. 0.09372626 0. 0.00550736 0.03665866 0. 0. 0.00651422 0. 0.00738776 0. 0.00386625 0. 0.00721514 0.02900551 0. 0.05036239 0. 0.04286243 0.07337299 0.02649865 0. 0. 0.02497154 0.1111951 0.02065703 0. 0. 0. 0. 0.12290592 0.0061464 0. 0. 0. 0. 0. 0.15465565 0. 0.00847926 0.05018251 0.11114596 0. 0.02453978 0.01981913 0.01510617 0. 0. 0. 0. 0. 0.02191404 0. 0.01109802 0. 0. 0.01412931 0. 0. 0. 0. 0. 0. 0. 0. 0.01298612 0. 0. 0. 0. 0. 0. 0. 0.04101541 0. 0. 0. 0. 0. 0.02115072 0.05605236 0.12609689 0. 0.01339665 0. 0. 0. 0. 0. 0.11183666 0 0.09688628 0. 0. 0. 0. 0. 0.17572734 0. 0.1379151 0. 0.01774204 0. 0. 0.01915645 0.16342808 0. 0.00202094 0. 0. 0. 0. 0.18942796 0. 0. 0. 0.05845224 0. 0. 0. 0. 0. 0. 0.19294386 0.21756673 0.05139332 0. 0.02665375 0.12016577 0.051585 0. 0. 0. 0.0036067 0.0540234 0. 0. 0.06178814 0. 0. 0. 0. 0.0280844 0. 0. 0.06412166 0. 0 0.137524 0.05167086 0. 0.0197652 0. 0. 0. 0.04285314 0.15722261 0. 0. 0.05923241 0. 0. 0. 0. 0. 0. 0. 0. 0. 0. 0.14718871 0. 0. 0. 0.06105956 0. 0. 0. 0.01194391 0. 0. 0. 0. 0. 0.1791745 0. 0. 0. 0. 0.2202653 0. 0. 0.06317589 0. 0.02332353 0.01481021 0. 0.09529169 0. 0.13832238 0. 11783378 0. 0.14023489 0. 0. 0. 0. 0.03340167 0. 0.

0. 0. 0. 0. 0. 0. 0. 0. 0. 0.0935358 0. 0. 0. 0. 0.1800088 0. 0.07987829 0. 0.08291682 0.01226721 0. 0. 0. 0. 0. 0. 0. 0. 0. 0. 0. 0. 0.0852061 0. 0.06087895 0.03293431 0. 0. 0. 0. 0. 0. 0. 0.1710799 0. 0. 0. 0. 0. 0. 0. 0. 0. 0.03869553 0. 0. 0. 0. 0. 0. 0.11299279 0. 0.1256792 0. 0. 0. 0. 0. 0. 0.07545868 0. 0. 0.07524645 0. 0. 0.12755004 0. 0.10815609 0. 0. 0. 0.]

At step 212 of the present disclosure, a feed forward fully connected network verifies, the pair of face images based on the concatenated distance vector. More specifically, the pair of face images are verified either as valid images or as imposter face images, in one embodiment. The decision network is a feed-forward fully connected network that takes the concatenated input from all the modules. This network enables to incorporate information from all the modules to predict the final decision, in one example embodiment of the present disclosure. In the present disclosure, the Siamese networks consisted of four fully connected layers with ELU activation function. The final decision network that takes the concatenated distance vectors from the modules also has four fully connected layers with ELU activation function. It is to be understood by a person having ordinary skill in the art and/or person skilled in the art that the verification process involves comparing the concatenated distance vectors with a previously stored concatenated distance vectors for similar input images type (e.g., the pair of face images received as input) for performing verification. Alternatively, such comparison of the concatenated distance vectors with the previously stored concatenated distance vectors for similar input images type may or may not be performed for verification of the pair of face images. It is to be understood by a person having ordinary skill in the art and/or person skilled in the art that the step of verifying of the pair of face images is performed by the modular Siamese network (or a neural network comprised in the memory 102) which may not be visualized (depending upon the application(s)). However, the verification of pair of face images received by the system 100 is being realized through experimental results as described herein by way of non-construing examples. Though, a pair of face images is received as input by the system 100, it is to be understood by a person having ordinary skill in the art or person skilled in the art that there could be more than 2 face images serving as an input, and such input to the system 100 shall not be construed as limiting the scope of the present disclosure.

Training Details:

The training of the modular Siamese network was carried out in 3 training phases. In the first phase, perceptual loss was used in training the feature extracting autoencoders. In the next phase, Siamese network were used to replace the decoders comprised in the feature extracting autoencoders and the system was then trained using the triplet loss, and the layers trained in the previous phase were frozen. Finally, a decision network is trained using Binary Cross-Entropy (BCE). The network was trained using an Adam optimization technique as known in the art in all of the three training phases. Through experiments and results it was observed that the feature extracting autoencoders can generate high quality reconstructions of the intended facial feature. Once training is completed, unmasked full images are fed as input to the autoencoders for reconstruction of the required facial region by incorporating relevant information of that facial feature into the latent feature vector. Each subnetwork can be trained in parallel as they are independent of each other. A complete face verification system that provides an end-to-end solution is obtained (e.g., refer system depicted in FIG. 3) upon completion of the training. Multitask cascaded convolutional networks (MTCNN) as known in the art was used for generation of facial landmarks that were used for masking.

Figure 6:
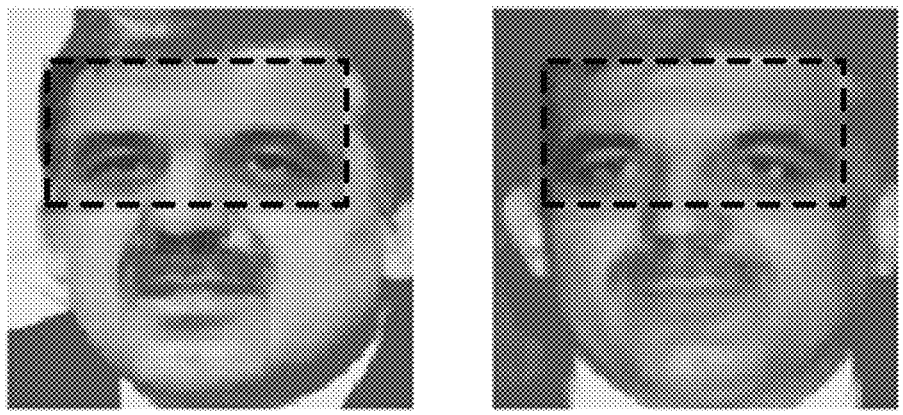
FIG. 6 depicts heatmap(s) being generated for input face images, in accordance with an embodiment of the present disclosure.

Interpretability in the Modular Siamese Network(s):

The modular Siamese Network (MSN) system generates inherently feature-level heatmaps that are intuitive and easily interpreted, it is natural to observe the similarity of high-level visual concepts instead of pixels by humans. A distance measure that reflects the visual similarity of the features is generated by each subnetwork or module of the modular Siamese network. This is achieved by computing the Euclidean distance between the twin output vectors produced by the Siamese networks for each module which represent a certain feature. A pairwise heatmap that incorporates similarity or dissimilarity of the features is generated using these distance measures and this is then overlayed on both images. The MSN system effectively localizes the similarities and dissimilarities of features in a pair of images. These heatmaps enable understanding of the decisions taken by the verification system. In other words, a feature-wise Euclidean distance is computed for each of the one or more features based on the computed distance vector. In the above examples, Eyes Feature-wise Euclidean Distance: 0.231, Nose Feature-wise Euclidean Distance: 0.214, Mouth Feature-wise Euclidean Distance: 0.386, and Remaining area Feature-wise Euclidean Distance: 0.541 were computed based on the distance vector. A heatmap for each of the one or more features is generated based on the computed feature-wise Euclidean distance. The heatmap is depicted in FIG. 6. More specifically, in FIG. 6, the heatmap for the one or more features (e.g., say eyes) is shown by way of black dash line box representation, in one embodiment of the present disclosure.

Experimental Results:

The face verification system 100 of FIGS. 1 through 3 was trained on the VGGFace2 dataset (e.g., publicly available dataset) and evaluated on Labeled Faces in the Wild (LFW) dataset (e.g., e.g., publicly available dataset—refer source 'http://vis-www.cs.umas.edu/lfw/').

Verification:

The accuracies of the individual modules and the MSN of the system 100 have been presented in Table 1. The accuracies for individual modules (e.g., one or more combinations of disentangling encoder and a corresponding Siamese network, constituting a module) have been calculated based on the optimum distance threshold being computed/estimated that maximizes accuracy.

TABLE 1

Accuracies of Modular Siamese Network and sub-modules

| No. | Model | Accuracy |
|---|---|---|
| 1 | Module 1—Eyes | 80.8% |
| 2 | Module 2—Nose | 73.2% |
| 3 | Module 3—Mouth | 74.5% |
| 4 | Module 4—Rest | 78.3% |
| 5 | Modular Siamese Network | 83.5% |

It is observed that the eyes module outperforms other modules, indicating that it could be the most discriminating feature. The performance can be further improved by further fine-tuning of parameters and using loss function(s). However, there could be performance drop expected as a trade-off between accuracy and robustness. The method of the present disclosure may be best-suited than models that have achieved state of the art (SOTA) performance in scenarios where explain-ability and robustness are more important than the performance.

Feature-Level Heatmaps Generation:

As mentioned above, feature-level heatmaps are intuitive and are easily interpretable by humans, when looked at features as whole and not at pixels individually. The pairwise heatmaps that are inherently generated by the method of the present disclosure incorporate relative information taking both of the input images into consideration. The feature-wise Euclidean distances computed by each module comprised in the MSN are used to generate the heatmaps. FIG. 6, with reference to FIGS. 1 through 5, depicts heatmap(s) being generated for input face images, in accordance with an embodiment of the present disclosure. As can be seen in FIG. 6, features that look visually similar are shown in a particular pattern or color coding. For instance, features that look visually similar can be colored green and colored red when there is dissimilarity in the images. For true positives, high similarity is indicated in the heatmap for features that are visually close, as expected. High dissimilarity between the eyes of the first impostor pair was shown by the system, which seems to be in-line with human perception. Failure status of the system or occurrence of system failure could be helpful for rectification of the system. It was further observed that both persons wearing eyeglasses caused specific module responsible for processing eye as a feature to assign low distance score and when accompanied another similar looking feature resulted in misclassification (not shown in FIGS.). Another heatmap of the pair of images (not shown in FIGS.) demonstrated how poor lighting on eyes and similar looking noses fooled the system. The heatmaps of another pair of images (not shown in FIGS.) illustrated the verification effect based on a pose and when sunglasses were used. The eye processing module computed high distance score for one of the scenarios wherein the same person was wearing eyeglasses in one of the pair of images. In the second, high dissimilarity score (not shown in FIGS.) was predicted because of closing of the eyes. could the system 100 was able to generate meaningful messages for correcting in case of any issues such as a failure, like removing eyeglasses or changing pose for better lighting, since the computations were carried out real-time at feature level.

Figure 7:
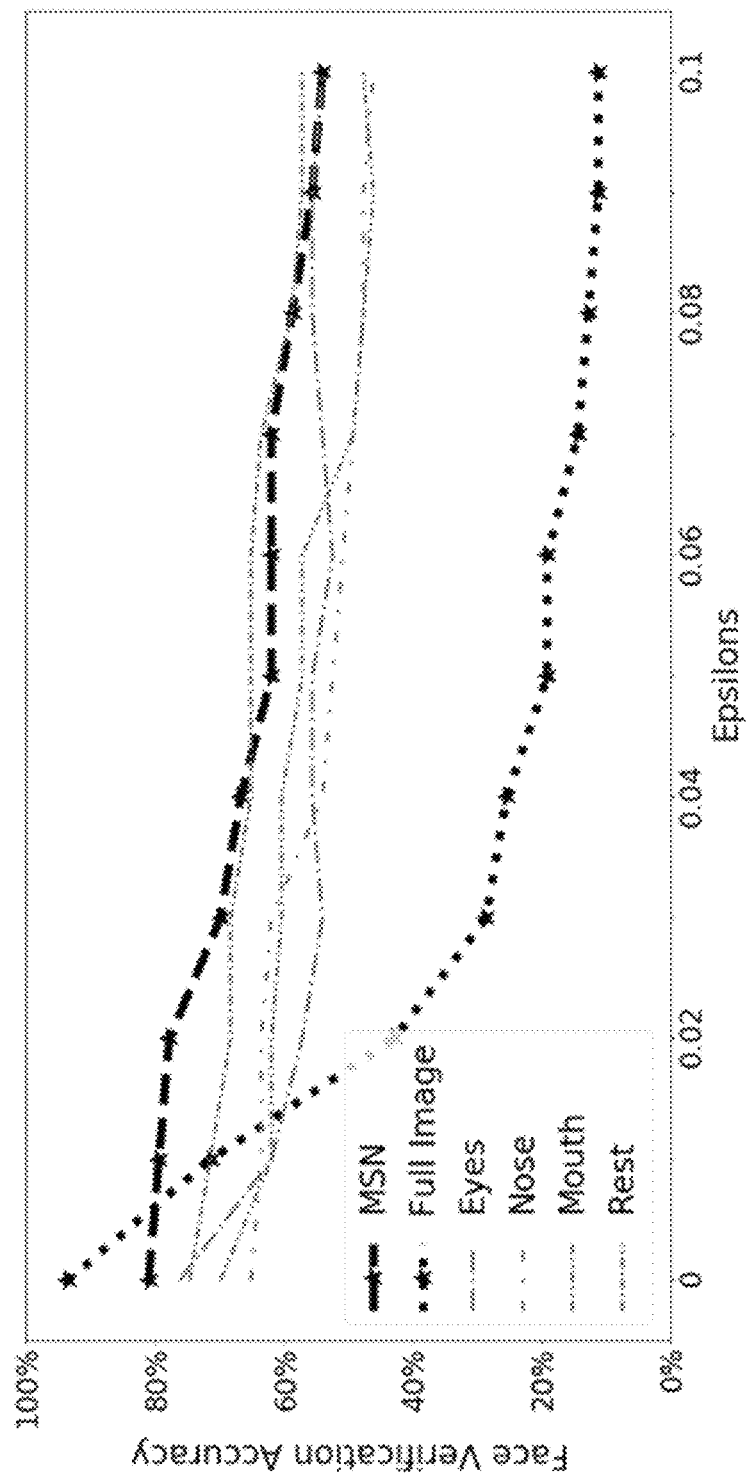
FIGS. 7 and 8 depict graphical representations illustrating performance of the method of the present disclosure under Fast Gradient Sign Method (FGSM) Attack, in accordance with an embodiment of the present disclosure.
Figure 8:
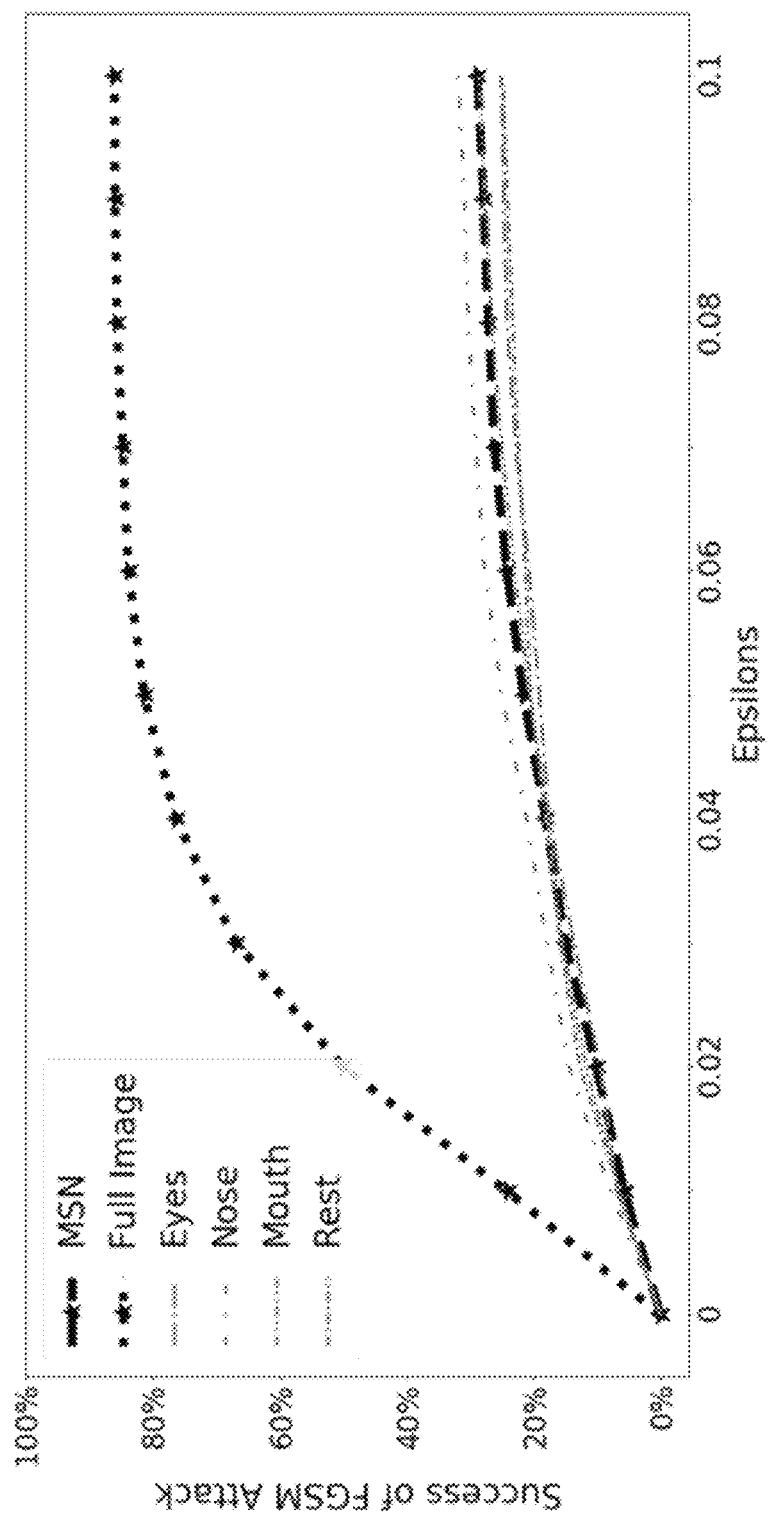
Figure 9:
FIG. 9 depicts adversarial faces generated using Fast-Gradient Sign Method (FGSM), in accordance with an embodiment of the present disclosure. As can be observed, when $\varepsilon$ increases, perturbations become more evident.

Performance Under Adversarial Attacks:

The robustness and resistance of the method of the present disclosure was tested against the adversarial attacks such as the Fast Gradient Sign Method (FGSM), DeepFool and FGSM in fast adversarial training (FFGSM). Assuming the first image in the two image pairs to be the test image, and the other one to be the anchor image, only test image that is similar is attacked is accounted during the experiments conducted. For comparison, the system 100 and method of the present disclosure considered the well-known FaceNet model which has reported SOTA performance. The results have been plotted in FIGS. 7 and 8. More specifically, FIGS. 7 and 8, with reference to FIGS. 1 through 6, depict graphical representations illustrating performance of the method of the present disclosure under Fast Gradient Sign Method (FGSM) Attack, in accordance with an embodiment of the present disclosure. The method of the present disclosure has shown significantly higher robustness than FaceNet against all three adversarial attacks. In FIG. 7, MSN refers to the final accuracy of the modular Siamese network as implemented by the present disclosure while 'Eyes', 'Nose', 'Mouth' and 'Rest' refer to the accuracy of the four sub-modules present in the system of FIGS. 1 through 3. 'Full' refers to the accuracy of VGGFace model on the full image. FGSM attack is used to validate robustness of the face verification system 100 of the present disclosure in comparison to widely used existing model called 'VGGFace'. The strength of the attack increases with an increase in the parameter 'Epsilon' ($\varepsilon$). As depicted in FIG. 7, the face verification system of FIGS. 1 through 3 is more robust than VGGFace model against FGSM attack. The performance deviations become more evident with increase in $\varepsilon$. In FIG. 8, it can be noticed that the FGSM attack has low attack success rate against the face verification system of the present disclosure while it is able to achieve high attacks success rate against VGGFace model. The modular Siamese network-based face verification approach limits the success of the FGSM attack even for higher $\varepsilon$. It was further noticed that individual modules of the MSN are more resistant to the attack. Since MSN makes the final prediction based on these modules that are functionally independent, it inherits its robustness from them. The enhanced robustness could be attributed to the fault tolerant nature of modular neural networks (MNN). Additionally, the encoders used for extracting feature specific latent representations are trained to retain only the most salient features because of the bottleneck latent layer and as a result, they may be able to resist against noise or perturbations. FIG. 9, with reference to FIGS. 1 through 8, depicts adversarial faces generated using Fast-Gradient Sign Method (FGSM), in accordance with an embodiment of the present disclosure. As can be observed, when $\varepsilon$ increases, perturbations become more evident.

Embodiments of the present disclosure provide face verification system and method that construct a modular Siamese network for face verification. More specifically, by implementing the modular Siamese network for face verification, through experiments as described and presented above, the system and method are more robust, and this enhanced robustness could be attributed to the fault tolerant nature of modular network. Since the modules are independent in their functioning, the failure of one module due to some noise in the corresponding image region does not affect other modules. On the other hand, the same noise could lead to the failure of a system that processes the image as a whole. Further, autoencoders are trained to retain only important information in the latent vectors, this also leads to considerable elimination of noise. Furthermore, the present disclosure provides explanations to all decision on the fly, making all decisions inherently interpretable. This is achieved by computing feature-wise Euclidean distance for all features on vectors outputted by the Siamese networks in each module. These distance scores are then visualized and overlayed on the corresponding regions for making decisions on the fly.

The present disclosure enables interaction between the system and user(s) and informs what could have gone wrong and also suggest possible corrections. For instance, the heatmaps and similarity scores generated at feature-levels can be used to convey what went wrong to the user. The example as discussed above, a user wearing sunglasses tries to verify his identity using the face verification system of the present disclosure, but the eyes module fails to pass the test. This information can be displayed to the user and prompted a suggestion to make sure eyes are clearly visible. This help the user to remove his sunglasses and verify his identity successfully.

Furthermore, owing to inherently interpretable structure of the system, identifying, and debugging certain issues becomes relatively easier. This is achieved by implementing various independent module(s) (e.g., combination of disentangling encoder and a corresponding Siamese network), where each such combination can be modified without disturbing other parts of the system. For example, if the mouth module (or a combination responsible for processing mouth feature from an input image) is causing the system to reject all users who have a moustache it can be identified easily using the heatmap explanations being generated by the system (identifying a bug). Users such as developer(s) can then study and identify the cause of the bug, for instance, this specific bug could be due to insufficient training examples of people with moustache in the training phase. Such module(s) alone can be retrained with a (larger and more) comprehensive dataset containing multiple images which include a few examples with facial hair, thereby providing flexibility of replacing modules in the system.

Additionally, the system of the present disclosure can handle partially occluded images and is more fault tolerant. This characteristic of the system is due to the independence of modules from one another and leads to higher fault tolerance. For instance, even if the entire mouth region is occluded due to facial accessories such as masks, it does not affect the functioning of the eye's module (or the combination of disentangling encoder and Siamese network that is responsible for processing eye as a feature). Thus, this enhances the fault tolerance of the system.

It is to be understood by a person having ordinary skill in the art or person skilled in the art that training such systems (e.g., systems of FIGS. 1 through 3) of the present disclosure can pose a significant challenge, wherein in the present disclosure the training process has to be broken into one or more phases/stages. For instance, such phases include say, a first phase for training disentangling autoencoders, a second phase for Siamese networks, and a third phase for Decision networks. Such training phases shall not be construed as limiting the scope of the present disclosure. It is to be understood by a person having ordinary skill in the art or person skilled in the art that training in multiple phases comes with implementation complexities, such as freezing and unfreezing of identified relevant layers. Further, hyper parameter tuning is more complex due to the sequential phases, and changes in one phase reflect in the subsequent phases.

Having the interpretations of predictions or decisions while they are being taken by deep learning models could prove to be paramount in many applications. While post-hoc interpretations might help in understanding the behavior of the model, they may not be of much help in generating real-time explanations. Incorporating interpretability to the system of the present disclosure itself could allow the present disclosure to handle human errors by enabling communication with the user, informing them of what went wrong and suggesting rectifications.

More specifically, present disclosure provides systems and methods to learn latent representations of high-level facial features. Specifically, a (modular) face verification system is provided that inherently generates interpretations of its decisions with the help of the learned feature specific latent representations. The need and importance of having such a readily interpretable systems are described as above. Through experimental results, it is demonstrated that there is a need for such system 100 of FIGS. 1 through 3 that has higher resistance to adversarial examples as described herein.

Thus, a flexible face verification system is provided by the present disclosure that provides on-the-fly and easily interpretable feature level explanations, and allows modifications to specific components/modules of the system which enables providing real-time feedback thereby increasing the robustness of the system to such adversarial attacks.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for face verification, comprising:
    receiving, by a pre-trained feature extractor executed via one or more hardware processors, a pair of face images corresponding to one or more users;
    generating, via the pre-trained feature extractor, a pair of feature vectors using the pair of face images corresponding to the one or more users, wherein each feature vector from the pair of feature vectors comprises one or more features corresponding to the one or more users;
    generating, via one or more disentangling encoders comprised in a modular Siamese network executed by the one or more hardware processors, a pair of feature-specific disentangling embeddings based on the pair of feature vectors;
    computing, via a plurality of corresponding Siamese networks comprised in the modular Siamese network executed by the one or more hardware processors a distance vector for each feature comprised in the pair of feature-specific disentangling embeddings, wherein each Siamese network from the plurality of Siamese networks is operatively connected to a corresponding disentangling encoder of the one or more disentangling encoders;
    concatenating the distance vector computed for each feature by each of the plurality of Siamese networks to obtain a concatenated distance vector; and
    verifying, via a feed forward fully connected network executed by the one or more hardware processors, the pair of face images based on the concatenated distance vector.

2. The processor implemented method of claim 1, further comprising:
    computing a feature-wise Euclidean distance for each of the one or more features based on the computed distance vector; and
    generating a heatmap for each of the one or more features based on the computed feature-wise Euclidean distance.

3. The processor implemented method of claim 1, wherein the pair of face images comprises a pair of valid face images or a pair of imposter face images.

4. The processor implemented method of claim 1, wherein the step of receiving, by the pre-trained feature extractor executed via the one or more hardware processors, the pair of face images corresponding to the one or ore users is preceded by:
    receiving, via the one or more hardware processors, one or more input face images of the one or more users;
    masking, via the one or more hardware processors, the one or more input face images to obtain one or more reconstructed target images, wherein each of the one or more reconstructed target images comprises one or more region of interests;
    training, one or more disentangling autoencoders via the one or more hardware processors, using the one or more reconstructed target images comprising the one or more regions of interests to obtain one or ore trained disentangling autoencoders; and
    substituting one or more decoders comprised in the one or more trained disentangling autoencoders with one or more corresponding Siamese networks to obtain a modular Siamese network.

5. The processor implemented method of claim 4, wherein a latent dimension comprised between an encoder and a decoder of each of the one or more disentangling autoencoders is lower than an input dimension.

6. A system, comprising:
    a memory storing instructions;
    one or more communication interfaces; and
    one or more hardware processors coupled to the memory via the one or more communication interfaces, wherein the one or more hardware processors are configured by the instructions to:
    receive, by a pre-trained feature extractor executed via the one or more hardware processors, a pair of face images corresponding to one or more users;
    generate, via the pre-trained feature extractor, a pair of feature vectors using the pair of face images corresponding to the one or more users, wherein each feature vector from the pair of feature vectors comprises one or more features corresponding to the users;
    generate, via one or more disentangling encoders comprised in a modular Siamese network executed by the one or more hardware processors, a pair of feature-specific disentangling embeddings based on the pair of feature vectors;
    compute, via a plurality of corresponding Siamese networks comprised in the modular Siamese network executed by the one or more hardware processors a distance vector for each feature comprised in the pair of feature-specific disentangling embeddings, wherein each Siamese network from the plurality of Siamese networks is operatively connected to a corresponding disentangling encoder of the one or ore disentangling encoders;
    concatenate the distance vector computed for each feature by each of the plurality of Siamese networks to obtain a concatenated distance vector; and
    verify, via a feed forward fully connected network, the pair of face images based on the concatenated distance vector.

7. The system of claim 6, wherein the one or more hardware processors are further configured by the instructions to:
    compute a feature-wise Euclidean distance for each of the one or more features based on the computed distance vector; and
    generate a heatmap for each of the one or more features based on the computed feature-wise Euclidean distance.

8. The system of claim 6, wherein the pair of face images comprises a pair of valid face images or a pair of imposter face images.

9. The system of claim 6, wherein the modular Siamese network is obtained by:
receiving, via the one or more hardware processors, one or more input face images of the one or more users;
masking, via the one or more hardware processors, the one or more input face images to obtain one or more reconstructed target images, wherein each of the one or more reconstructed target images comprises one or more region of interests;
training, one or more disentangling autoencoders via the one or more hardware processors, using the one or more reconstructed target images comprising the one or more regions of interests to obtain one or more trained disentangling autoencoders; and
substituting one or more decoders comprised in the one or more trained disentangling autoencoders with one or more corresponding Siamese networks to obtain the modular Siamese network.

10. The system of claim 9, wherein a latent dimension comprised between an encoder and a decoder of each of the one or more disentangling autoencoders is lower than an input dimension.

11. One or more non-transitory machine readable information storage mediums comprising one or more instructions which when executed by one or more hardware processors causes a method for face verification by:
receiving, by a pre-trained feature extractor executed via the one or more hardware processors, a pair of face images corresponding to one or more users;
generating, via the pre-trained feature extractor, a pair of feature vectors using the pair of face images corresponding to the one or more users, wherein each feature vector from the pair of feature vectors comprises one or more features corresponding to the users;
generating, via one or more disentangling encoders comprised in a modular Siamese network executed by the one or more hardware processors, a pair of feature-specific disentangling embeddings based on the pair of feature vectors;
computing, via a plurality of corresponding Siamese networks comprised in the modular Siamese network executed by the one or more hardware processors a distance vector for each feature comprised in the pair of feature-specific disentangling embeddings, wherein each Siamese network from the plurality of Siamese networks is operatively connected to a corresponding disentangling encoder of the one or more disentangling encoders;
concatenating the distance vector computed for each feature by each of the plurality of Siamese networks to obtain a concatenated distance vector; and
verifying, via a feed forward fully connected network, the pair of face images based on the concatenated distance vector.

12. The one or more non-transitory machine readable information storage mediums of claim 11, wherein the method further comprises:
computing a feature-wise Euclidean distance for each of the one or ore features based on the computed distance vector; and
generating a heatmap for each of the one or more features based on the computed feature-wise Euclidean distance.

13. The one or more non-transitory machine readable information storage mediums of claim 11, wherein the pair of face images comprises a pair of valid face images or a pair of imposter face images.

14. The one or more non-transitory machine readable information storage mediums of claim 11, wherein the step of receiving, by the pre-trained feature extractor executed via the one or more hardware processors, the pair of face images corresponding to the one or more users is preceded by:
receiving, via the one or more hardware processors, one or more input face images of the one or more users;
masking, via the one or more hardware processors, the one or more input face images to obtain one or more reconstructed target images, wherein each of the one or more reconstructed target images comprises one or more region of interests;
training, one or more disentangling autoencoders via the one or more hardware processors, using the one or more reconstructed target images comprising the one or more regions of interests to obtain one or more trained disentangling autoencoders; and
substituting one or more decoders comprised in the one or more trained disentangling autoencoders with one or more corresponding Siamese networks to obtain a modular Siamese network.

15. The one or more non-transitory machine readable information storage mediums of claim 14, wherein a latent dimension comprised between an encoder and a decoder of each of the one or more disentangling autoencoders is lower than an input dimension.

* * * * *